United States Patent
Osvald et al.

(10) Patent No.: US 9,272,212 B2
(45) Date of Patent: Mar. 1, 2016

(54) AUTOMATED APPARENT RESPONSES

(71) Applicant: Zynga Inc., San Francisco, CA (US)

(72) Inventors: John Osvald, Albany, CA (US); Michael Waite, Alamo, CA (US); Kyle Sauger, Burlingame, CA (US); Lauren Duncan, San Francisco, CA (US); Erik Nilsson, South San Francisco, CA (US)

(73) Assignee: Zynga Inc., San Francisco, CA (US)

( * ) Notice: Subject to any disclaimer, the term of this patent is extended or adjusted under 35 U.S.C. 154(b) by 95 days.

(21) Appl. No.: 14/091,331

(22) Filed: Nov. 26, 2013

(65) Prior Publication Data

US 2014/0087886 A1 Mar. 27, 2014

Related U.S. Application Data

(62) Division of application No. 13/196,852, filed on Aug. 2, 2011, now Pat. No. 8,622,841.

(51) Int. Cl.
*A63F 13/00* (2014.01)
*A63F 13/30* (2014.01)

(52) U.S. Cl.
CPC ........... *A63F 13/12* (2013.01); *A63F 2300/305* (2013.01); *A63F 2300/556* (2013.01); *A63F 2300/5593* (2013.01); *A63F 2300/572* (2013.01)

(58) Field of Classification Search
CPC ... A63F 13/5375; A63F 13/79; A63F 13/795; A63F 2300/305; A63F 13/45; A63F 13/50; A63F 13/55; G06F 3/0631; G06F 3/0619; G06F 17/30292; G06F 12/1027
See application file for complete search history.

(56) References Cited

U.S. PATENT DOCUMENTS

| | | | | |
|---|---|---|---|---|
| 6,716,103 | B1 * | 4/2004 | Eck et al. | 463/45 |
| 7,275,994 | B2 * | 10/2007 | Eck et al. | 463/45 |
| 8,137,201 | B2 * | 3/2012 | Chickering et al. | 463/42 |
| 8,221,243 | B2 * | 7/2012 | Van Luchene | 463/42 |
| 8,226,485 | B1 * | 7/2012 | Mooney et al. | 463/42 |
| 8,226,486 | B2 * | 7/2012 | Mooney et al. | 463/42 |
| 8,226,487 | B2 * | 7/2012 | Mooney et al. | 463/42 |
| 2007/0087799 | A1 * | 4/2007 | Van Luchene | 463/1 |
| 2008/0004117 | A1 * | 1/2008 | Stamper et al. | 463/42 |
| 2008/0119274 | A1 * | 5/2008 | Eck et al. | 463/40 |
| 2010/0178985 | A1 * | 7/2010 | Chickering et al. | 463/42 |
| 2010/0216553 | A1 * | 8/2010 | Chudley et al. | 463/42 |
| 2012/0122590 | A1 * | 5/2012 | Nguyen | 463/42 |
| 2013/0035158 | A1 * | 2/2013 | Osvald et al. | 463/30 |
| 2013/0035164 | A1 * | 2/2013 | Osvald et al. | 463/42 |
| 2014/0235338 | A1 * | 8/2014 | Hansson et al. | 463/31 |

* cited by examiner

*Primary Examiner* — Milap Shah
*Assistant Examiner* — Thomas H Henry
(74) *Attorney, Agent, or Firm* — Martine Penilla Group, LLP

(57) ABSTRACT

Software at a massively multiplayer online (MMO) game website receives a request for assistance with a game task from a first player of a MMO game. The software transmits the request to a second player of the MMO game who is associated with the first player through a relationship recognized by the MMO game. The software determines whether the second player responds to the request within a time period. The time period depends on one or more factors related to game mechanics and to user data for the first player. Then if the second player does not respond within the time period and the game task is a game task whose completion can be assigned without the assistance of another player, the software assigns completion of the game task to the first player and transmits an automated apparent response to the first player.

20 Claims, 6 Drawing Sheets

AUTOMATED APPARENT RESPONSES

RELATED APPLICATION

This application is a divisional application of and claims priority to U.S. patent application Ser. No. 13/196,852, filed on Aug. 2, 2011, and entitled "Automated Apparent Responses in Massively Multiplayer Online Games". The disclosure of that application is incorporated herein by reference for all purposes.

BACKGROUND

A massively multiplayer online (MMO) game is capable of supporting thousands of players simultaneously. Typically, such games involve video. A social MMO game is a MMO that leverages an online social graph (or network) to make a MMO game more interesting to its players. Often social graphs are maintained by social networking websites such as Facebook or social media websites such as MySpace. But one might think of a contact or buddy list as a primitive social graph.

One tactic to make MMO games (including social MMO games) more engaging is to create a game task that is a social (or team) task, e.g., a task that requires assistance from a player's friends (e.g., on a social networking website) to accomplish.

However, if, for example, a player has relatively few friends or if the player's friends play the game relatively infrequently, such a social game task can lead to disappointment in the player and, in the worst case, the player's withdrawal from the game. In turn, player disappointment/withdrawal can result in a reduction in the game's revenue potential (e.g., from the purchase of virtual goods or from third-party advertisements).

SUMMARY

In an example embodiment, a processor-executed method is described for engaging players in a MMO game. According to the method, the software at a MMO game website receives a request for assistance with a game task from a first player of a MMO game. The software transmits the request to a second player of the MMO game who is associated with the first player through a relationship recognized by the MMO game. The software determines whether the second player responds to the request within a time period. The time period depends on one or more factors related to game mechanics and to user data for the first player. Then if the second player does not respond within the time period and the game task is a game task whose completion can be assigned without the assistance of another player, the software assigns completion of the game task to the first player; and (2) transmits an automated apparent response to the first player.

In another example embodiment, an apparatus is described, namely, a computer-readable storage medium that persistently stores a program for engaging players in a MMO game. The program might be part of the software at a MMO game website. The program receives a request for assistance with a game task from a first player of a MMO game. The program transmits the request to a second player of the MMO game who is associated with the first player through a relationship recognized by the MMO game. The program determines whether the second player responds to the request within a time period. The time period depends on one or more factors related to game mechanics and to user data for the first player. Then if the second player does not respond within the time period and the game task is a game task whose completion can be assigned without the assistance of another player, the program assigns completion of the game task to the first player; and (2) transmits an automated apparent response to the first player.

Another example embodiment also involves a processor-executed method for engaging players in a social MMO game. According to the method, software at social MMO game website receives a request for assistance with a game task from a first player of a social MMO game. The software transmits the request to a second player of the social MMO game who is associated with the first player through a relationship that allows the second player to access a profile or stream associated with the first player and allows the first player to access a profile or stream associated with second player. The software monitors whether the second player responds to the request within a time period. The time period depends on one or more factors including data received from the profile or stream associated with the first player. Then if the second player does not respond within the time period and the game task is a game task whose completion can be assigned without the assistance of another player, the software: (1) assigns completion of the game task to the first player; and (2) transmits an automated apparent response to the first player Other aspects and advantages of the inventions will become apparent from the following detailed description, taken in conjunction with the accompanying drawings, which illustrate by way of example the principles of the inventions.

DETAILED DESCRIPTION

In the following description, numerous specific details are set forth in order to provide a thorough understanding of the exemplary embodiments. However, it will be apparent to one skilled in the art that the example embodiments may be practiced without some of these specific details. In other instances, process operations and implementation details have not been described in detail, if already well known.

Figure 1:
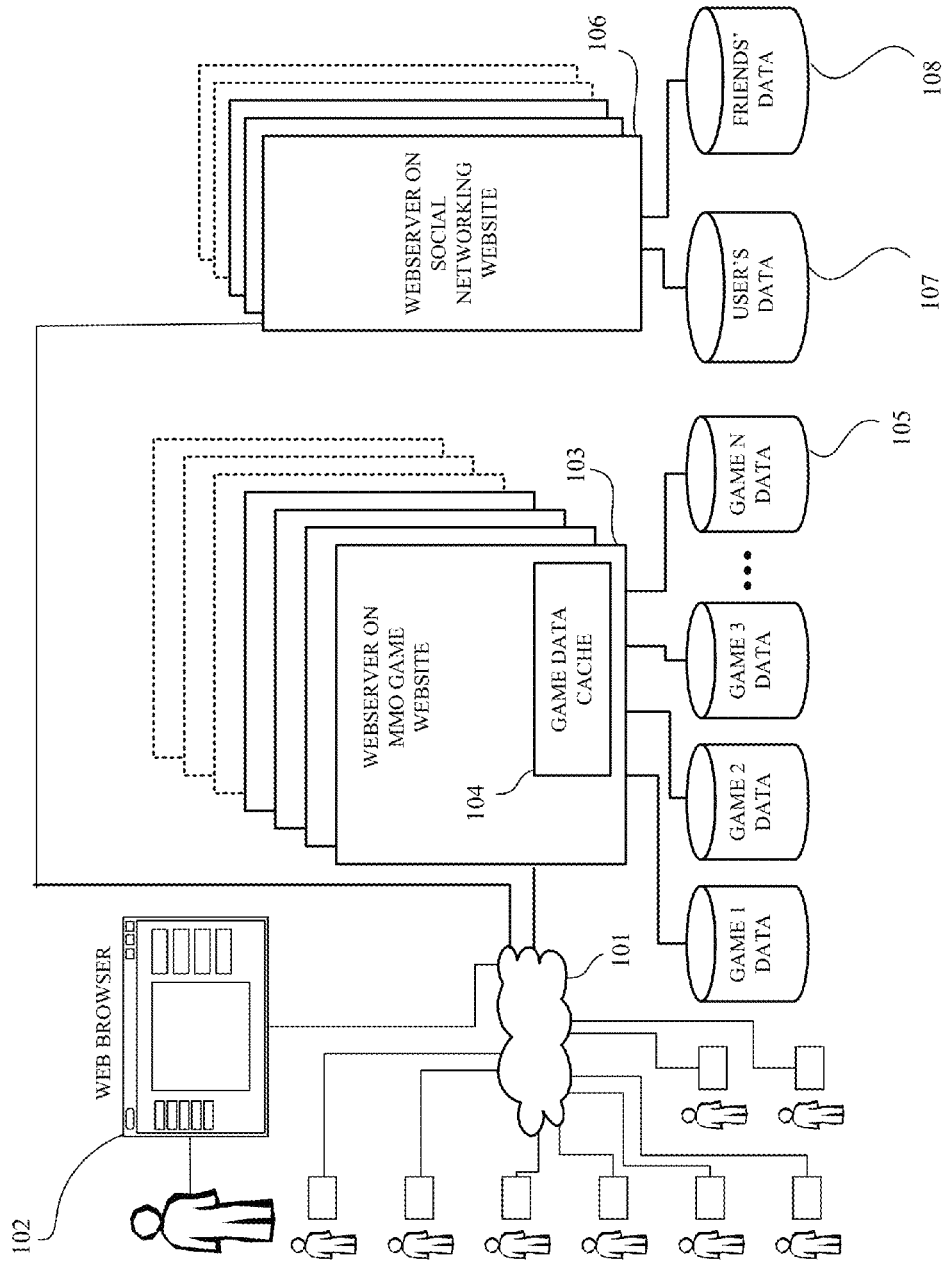
FIG. 1 is a simplified diagram that illustrates a network for a social MMO game, in accordance with an example embodiment.

FIG. 1 is a simplified diagram that illustrates a network for a social MMO game, in accordance with an example embodiment. As depicted in this figure, a personal computing device 102 is connected by a network 101 (e.g., a wide area network (WAN) including the Internet, which might be wireless in part or in whole) with a website 103 hosting a massively multiplayer online game (e.g., a website such as Zynga hosting FarmVille or Blizzard Entertainment hosting World of Warcraft) and a website 106 hosting a social network (e.g., a social networking website such as Facebook or a social media website such as MySpace). The personal computing device 102 might be a laptop or other personal computer or a mobile device such as a smartphone, e.g., an iPhone, Blackberry, Android, etc. In an example embodiment, each of the websites 103 and 106 might be composed of a number of webservers connected by a network (e.g., a local area network (LAN) or a WAN) to each other in a cluster or other distributed system which might execute cloud platform software as described in further detail below. The webservers in website 103 and 106 might also be connected (e.g., by a storage area network (SAN)) to persistent storage 105 and 107-108, respectively. In an example embodiment, persistent storage 105 and 107-108 might include a redundant array of independent disks (RAID).

Persistent storage 105 (e.g., the persistent storage associated with game N) might be used to store algorithms and data related to a game and its players, including data about the players received by website 103 from website 106, as described in further detail below. In an example embodiment, some of the data from persistent storage 105 might be cached in volatile memory in webservers on website 103 in order to improve performance, as also described in further detail below. Persistent storage 107 might be used to store profile and associated stream data regarding the user of personal computing device 102. Similarly, persistent storage 108 might be used to store profile and associated stream data regarding persons (e.g., friends) associated with that user, e.g., through a social graph (or network). It will be appreciated that persistent storage 107 and persistent storage 108 might well be the same persistent storage. They have been depicted as separate here for purposes of illustration to emphasize that a user typically has greater access rights to his/her profile and stream data than to the profile and stream data of his/her friends.

In an example embodiment, personal computing device 102 might be a laptop or other personal computer. In that event, personal computing device 102 and the webservers in website 103 and 106 might include (1) hardware consisting of one or more microprocessors (e.g., from the x86 family or the PowerPC family), volatile storage (e.g., RAM), and persistent storage (e.g., a hard disk or solid-state drive), and (2) an operating system (e.g., Windows, Mac OS, Linux, Windows Server, Mac OS Server, etc.) that runs directly or indirectly (e.g., through virtualization software) on the hardware. Or the operating system for the webservers might be replaced by a hypervisor or other virtualization software. In an alternative example embodiment personal computing device 102 might be a mobile device that includes (1) hardware consisting of one or more microprocessors (e.g., from the ARM family), volatile storage (e.g., RAM), and persistent storage (e.g., flash memory such as microSD) and (2) an operating system (e.g., Symbian OS, RIM BlackBerry OS, iPhone OS, Palm webOS, Windows Mobile, Android, Linux, etc.) that runs on the hardware.

Also in an example embodiment, personal computing device 102 might include a web browser as an application program or part of an operating system. Examples of web browsers that might execute on personal computing device 102 if it is a laptop or other personal computer include Internet Explorer, Mozilla Firefox, Safari, and Google Chrome. Examples of browsers that might execute on personal computing device 102 if it is a mobile device include Safari, Mozilla Firefox, Android Browser, and Palm webOS Browser. It will be appreciated that users of personal computing device 102 might use browsers to communicate with software running on the webservers at website 103 and at website 106.

Figure 2A:
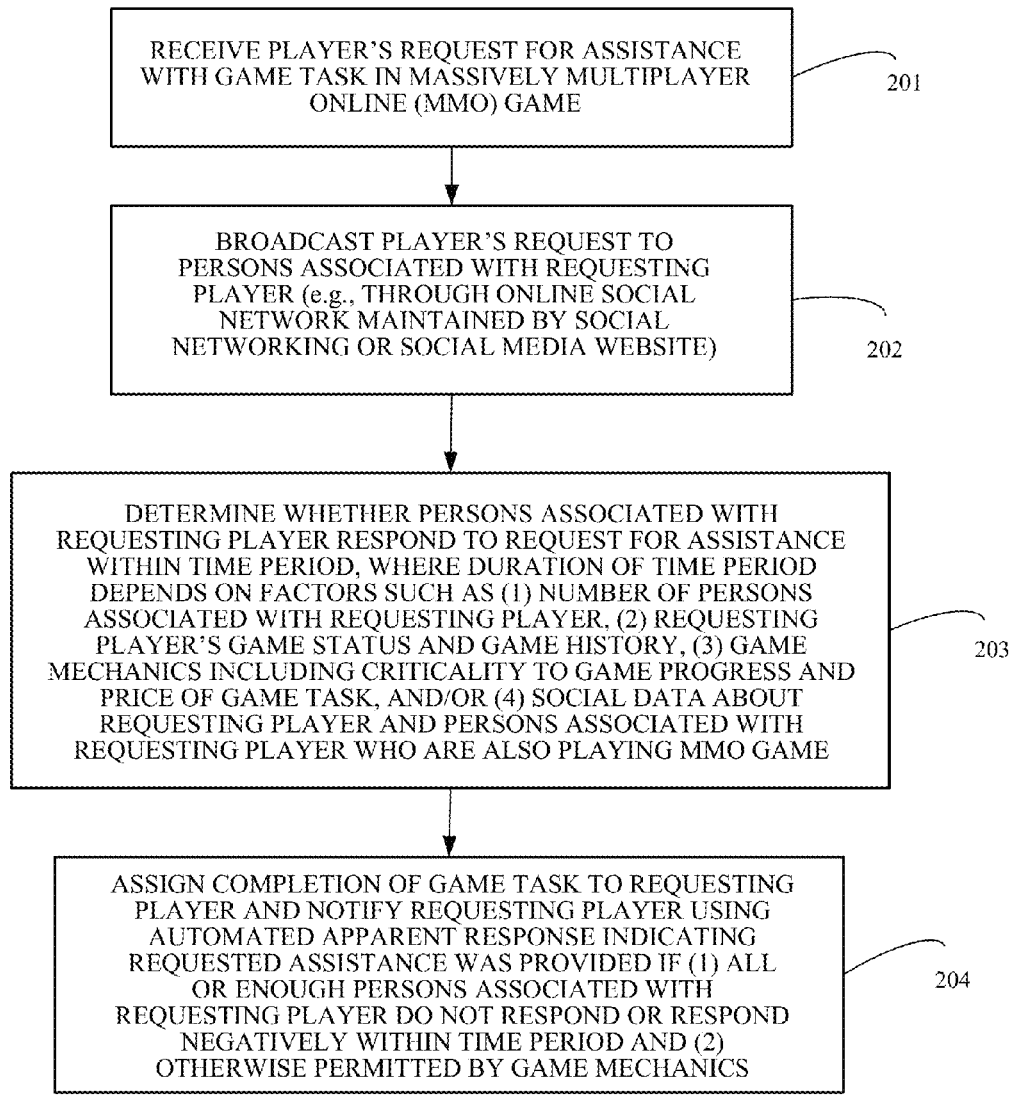
FIGS. 2A and 2B are flowchart diagrams that illustrate processes for transmitting an automated apparent response to a request for assistance on a game task, in accordance with an example embodiment.
Figure 2B:
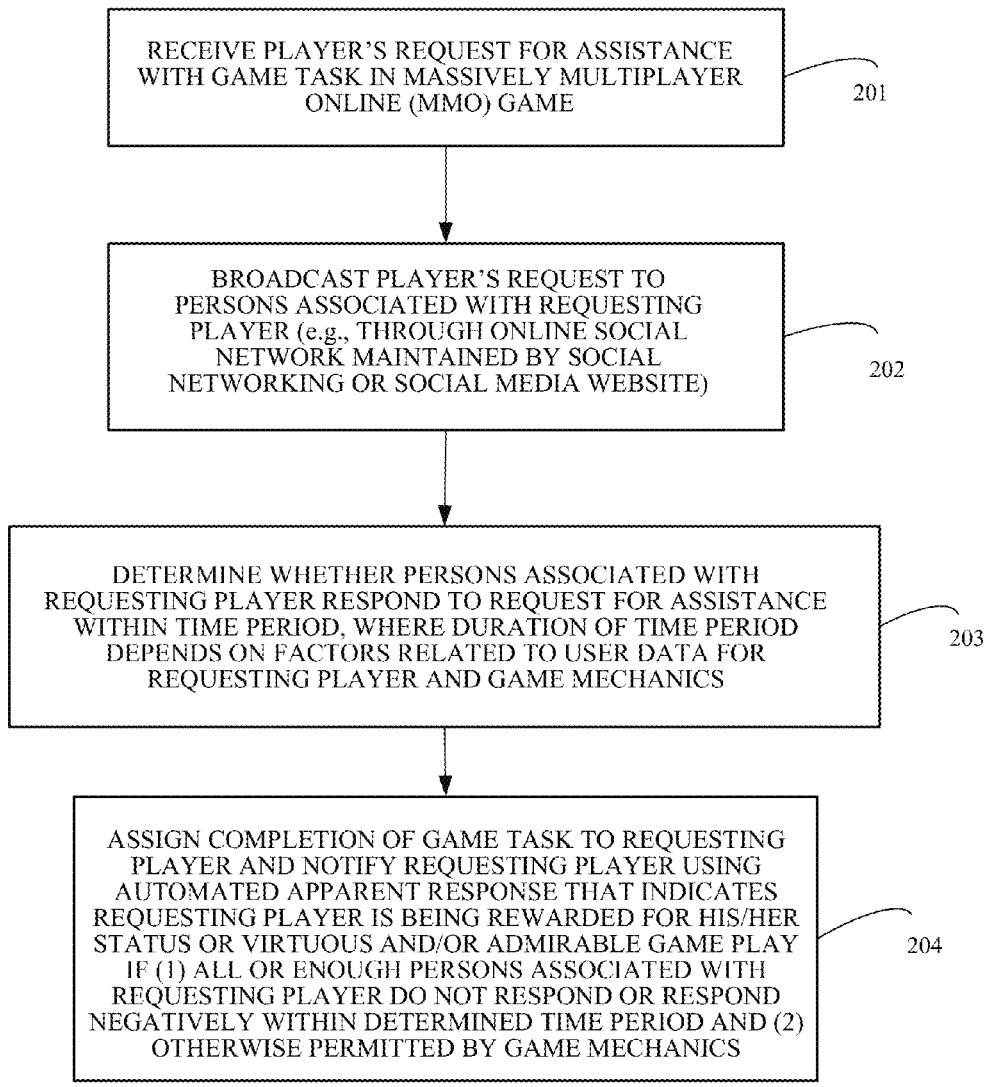

FIGS. 2A and 2B are flowchart diagrams that illustrate processes for transmitting an automated apparent response to a request for assistance on a game task, in accordance with an example embodiment. In an example embodiment, one or more of the operations in these processes might be performed by software running on the webservers at website 103 in FIG. 1. In an alternative example embodiment, one or more of the operations in these processes might be performed by client software or a web browser running on personal computing device 102 in FIG. 1. As used in this disclosure, the term "software" should be broadly interpreted to encompass firmware or any other programmable logic. Moreover, in an alternative example embodiment, these processes might be implemented in hardware, or a combination of hardware and software.

As depicted in FIG. 2A, software running on one or more webservers at website 103 (e.g., Zynga) receives a player's request for assistance with a game task in massively multiplayer online (MMO) game (e.g., raising a barn in FarmVille), in operation 201. In operation 202, the software broadcasts the player's request (e.g., through a game graphic and/or notification) for assistance to persons associated with the requesting player through a team roster, a contact or buddy list, or an online social graph (or network). In an example embodiment, the persons associated with the requesting player might be the player's Facebook friends who are players of the MMO game or, more generally, the player's Facebook friends. Also, in an example embodiment, the request might be broadcast using an application programming interface (API) exposed by software running on a social networking website or social media website depicted as website 106 in FIG. 1. Examples of such APIs include Facebook (REST) API, Facebook Graph API, Twitter API, Bebo's Social Networking API (SNAPI), OpenSocial API, etc. It will be appreciated that the Facebook APIs allow authorized third parties (e.g., third parties with an access token and/or permissions) to access a user's Facebook profile (e.g., for transmitting a Facebook notification) and the stream or feed (e.g., News Feed) associated with that profile.

In operation 203, the software determines whether the persons associated with the requesting player (e.g., the requesting player's Facebook friends who are players of the MMO) respond to the request for assistance (e.g., by clicking on the graphic representing the request) within a time period that is either pre-determined or dynamically determined, e.g., at runtime. In an example embodiment, the duration of the time period depends on factors such as: (1) the number of persons associated with the requesting player (e.g., the number of the requesting player's Facebook friends who are players of the MMO); (2) the requesting player's game status and game history; (3) the game mechanics including the criticality of the game task to progress in the game and the price (real or virtual) of the game task; and/or (4) social data about the requesting player or the persons associated with the requesting player who are also playing the MMO game (e.g., posts to the requesting player's Facebook profile and stream or posts to the profiles and streams of the requesting player's Facebook friends who are also playing the MMO game). For example, the requesting player might post a status update to his/her profile and/or stream indicating frustration with the lack of response to the request for assistance, resulting in a shortening of the time period used in operation 203.

Then in operation 204, the software assigns completion of the game task to the requesting player and notifies the requesting player using an automated apparent response indicating the requested assistance was provided (e.g., by one or more of the persons associated with the requesting player) if: (1) all or enough of the persons associated with the requesting player (e.g., the requesting player's Facebook friends who are also playing the MMO game) do not respond or respond negatively within the time period; and (2) if assignment of completion of the task is otherwise permitted by the game mechanics.

As indicated above, the duration of the time period in operation 203 depends on a number of representative factors, one of which is the requesting player's game status and game history. The requesting player's game status might depend on, among other things, the game resources currently available to the requesting player (e.g., the amount of the requesting player's virtual currency, virtual goods, virtual services, virtual energy, etc.) and/or the game level of the requesting player, in an example embodiment. Also in an example embodiment, the requesting player's history might include the number of times the requesting player has made the same or a similar request, including the number of times the requesting player has made a similar request in another MMO game on the same website. In an alternative example embodiment, the duration of the time period in operation 203 might also depend on the game status and the game history of each person associated with the requesting person.

FIG. 2B is a flowchart diagram that illustrates another process for transmitting an automated apparent response to a request for assistance on a game task, in accordance with an example embodiment. Here again, in an example embodiment, one or more of the operations in this process might be performed by software running on the webservers at website 103 in FIG. 1. In an alternative example embodiment, one or more of the operations in this process might be performed by client software or a browser running on personal computing device 102 in FIG. 1.

As depicted in FIG. 2B, software running on one or more webservers receives a player's request for assistance with a game task in massively multiplayer online (MMO) game (e.g., raising a barn in FarmVille), in operation 201. In operation 202, the software broadcasts the player's request (e.g., through a game graphic and/or notification) for assistance to persons associated with player through a team roster, a contact or buddy list, or an online social graph (or network). Here again, in an example embodiment, the persons associated with the requesting player might be the player's Facebook friends who are players of the MMO game or, more generally, the player's Facebook friends. Also, in an example embodiment, the request might be broadcast using an application programming interface (API) exposed by software running on a social networking website or social media website depicted as website 106 in FIG. 1.

In operation 203 of FIG. 2B, the software determines whether the persons associated with the requesting player (e.g., the requesting player's Facebook friends who are players of the MMO) respond to the request for assistance (e.g., by clicking on the graphic representing the request) within a time period that is either pre-determined or dynamically determined, e.g., at runtime. In an example embodiment, the duration of the determined time period depends on factors related to user data for the requesting player and game mechanics, as described earlier with respect to FIG. 2A. Then in operation 204 of FIG. 2B, the software assigns completion of the game task to the requesting player and notifies the requesting player using an automated apparent response indicating that the requesting player is being rewarded for his/her status or virtuous and/or admirable game play (e.g., generosity in assisting other players with their game tasks or other similar quality) if: (1) all or enough of the persons associated with the requesting player (e.g., the requesting player's Facebook friends who are also playing the MMO game) do not respond or respond negatively within the determined time period; and (2) if assignment of completion of the task is otherwise permitted by the game mechanics.

Figure 3:
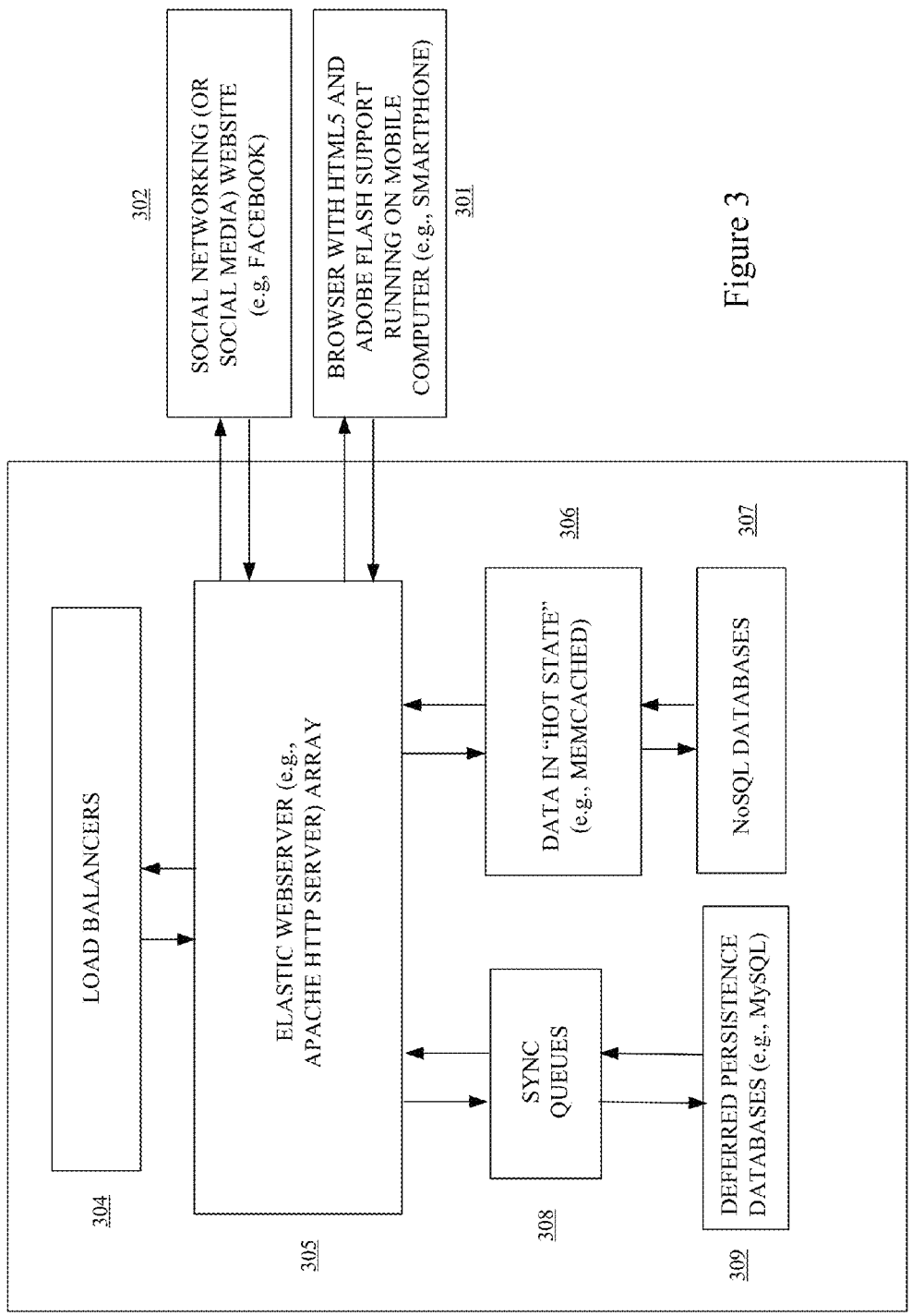
FIG. 3 is a simplified software diagram that illustrates the server software stack for a social MMO game, in accordance with an example embodiment.

FIG. 3 is a simplified software diagram that illustrates the server software stack for a social MMO game, in accordance with an example embodiment. As depicted in this figure, a player is using a web browser 301 with support for HTML5 and the Adobe Flash platform on a personal computing device (e.g., a laptop or smartphone) to interact with a software stack 303 on a website hosting a social MMO game. In an example embodiment, such a software stack might be implemented using a public, private, or hybrid cloud platform, e.g., a hybrid cloud platform whose public cloud is Amazon Electric Compute Cloud (EC2) and whose private cloud is built using Cloud.com's CloudStack software. Of course, in an alternative example embodiment, the software stack might be implemented using other public clouds and/or other private clouds that provide similar functionality. Or, the software stack might be implemented without resort to third-party cloud platforms (e.g., using load balancing and virtualization software provided by Citrix, VMware, Microsoft, or Xen, Map-Reduce and/or Google Filesystem software such as Hadoop, memory management/caching software such as Memcached and Membase, structured storage software such as MySQL, NoSQL, etc.). Parenthetically, it will be appreciated that SQL is an acronym which stands for Structured Query Language.

Returning to FIG. 3, the software stack 303 includes load balancers 304 (e.g., the load balancing and virtualization software provided by Citrix, VMware, Microsoft, or Xen) that balance the load between the webservers (e.g., Apache HTTP servers) in an elastic (or dynamic) array 305. It will be appreciated that the array is elastic because its size can be increased to accommodate additional webservers and decreased to accommodate fewer webservers. As further depicted in FIG. 3, the webservers in the elastic array 305 transmit HTTP requests to and from the web browser 301 and webservers on a social networking (or social media) website 302 such as Facebook. In an example embodiment, the webservers read data in a relatively "hot" state from and write data in a relatively "hot" state to memory caches 306 (e.g., memory caches created with Memcached and managed with MemBase), which in turn are backed by NoSQL databases 307. It will be appreciated that performance latencies can be significantly reduced by such an arrangement, which exploits both locality of reference and an absence of database-query overhead. But to conserve cache resources and reduce the size (and therefore the search time) of NoSQL databases, among other reasons, the webservers also read and write data to sync queues 308 in memory, which in turn, might be connected to query-language databases (e.g., MySQL) 309. It will be appreciated that this queued arrangement enables the deferred persistent storage of data which is not in a relatively "hot" state, e.g., a request for assistance with a game task as described above.

Figure 4A:
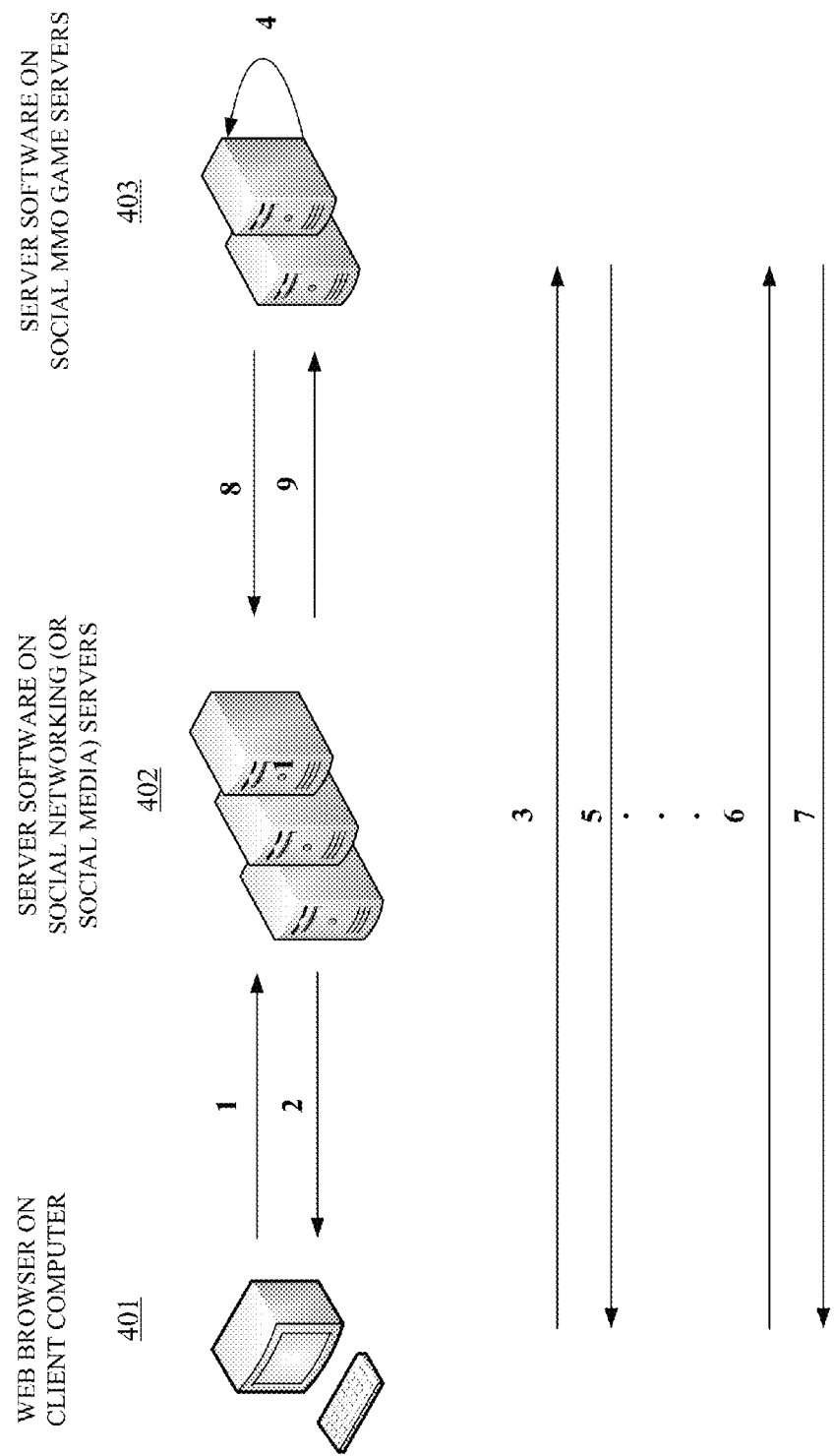
FIG. 4A is a simplified diagram that illustrates a sequence of transmissions associated with a social MMO game accessed from a social networking website, in accordance with an example embodiment.

FIG. 4A is a simplified diagram that illustrates a sequence of transmissions associated with a social MMO game accessed from a social networking website, in accordance with an example embodiment. As used here and elsewhere in this disclosure, the term "social networking website" is to be broadly interpreted to include, for example, any website that allows its users to selectively access (e.g., according to a contact list, buddy list, social graph, etc.) each other's profiles and/or streams or selectively communicate (e.g., according to a contact list, buddy list, social graph, etc.) with each other (e.g., using a messaging protocol such as email, instant messaging, short message service or SMS, etc.). As depicted in this diagram, a player has used a browser 401 on a client computer to log onto a social networking website, e.g., server software 402 (e.g., Facebook).

In operation 1, the player clicks on a graphic for a social MMO game, causing browser 401 to transmit an HTTP request to server software 402 (e.g., Facebook) for the game's initial web page. In operation 2, server software 402 (e.g., Facebook) returns an HTML5 and JavaScript (JS) web page consisting of an iFrame (e.g., Facebook "chrome") and an iFrame HTML tag for the game's initial web page. In operation 3, the browser uses the HTML tag to transmit a request to server software 403 (e.g., Zynga) for the game's initial web page to display inside the iFrame. The game's initial web page might be an application server page (e.g., PHP 5) or an HTML5 page. In operation 4, the application server page executes on server software 403 (e.g., Zynga), resulting in requests to databases and other servers as needed to complete generation of the web page, including possibly an HTTP request (not shown) transmitted to an API exposed by server software 402 (e.g., Facebook). In operation 5, the server software 403 (e.g. Zynga) returns the game's initial web page (e.g., HTML5 and JS) for the browser to display in the iFrame.

At some point thereafter, in operation 6, the player clicks on a graphic (e.g., representing a graphical user interface or GUI widget) on a game web page (e.g., HTML5 and JS), causing browser 401 to transmit an HTTP request to server software 403 (e.g., Zynga), requesting assistance on a game task. In operation 7, the server software 403 (e.g. Zynga) returns a web page (e.g., HTML5 and JS) to the browser indicating that the request was received. In operation 8, the server software 403 (e.g., Zynga) transmits an HTTP request to an API exposed by server software 402 (e.g., Facebook), posting a request for assistance to the profiles (e.g., through a Facebook notification) and/or streams of the requesting player's friends on the social network managed by server software 402 (e.g., Facebook). It will be appreciated that in order to access the friends' profiles and/or streams (e.g., using an access token), the server software 403 (e.g., Zynga) might have earlier obtained permission from the friends, e.g., when they joined the game. Then in operation 9, server software 402 (e.g., Facebook) sends a response, e.g., in Java Script Object Notation (JSON), to server software 403 (e.g., Zynga) describing the success or failure of the posting to each profile and/or stream. In a subsequent session, server software 403 (e.g., Zynga) might use operations similar to operations 8 and 9 to transmit an automated apparent response to the player, as described earlier.

In an alternative example embodiment, the game's initial web page (or some subsequent web page served up by the game) might have an Adobe Flash application (e.g., a Small Web Format or SWF file) embedded in it. In this alternative example embodiment, the user of browser 401 might thereafter interact with the Adobe Flash application (e.g., its GUI), causing it to interact with the server software 402 (e.g., Facebook) and the server software 403 (e.g., Zynga).

Figure 4B:
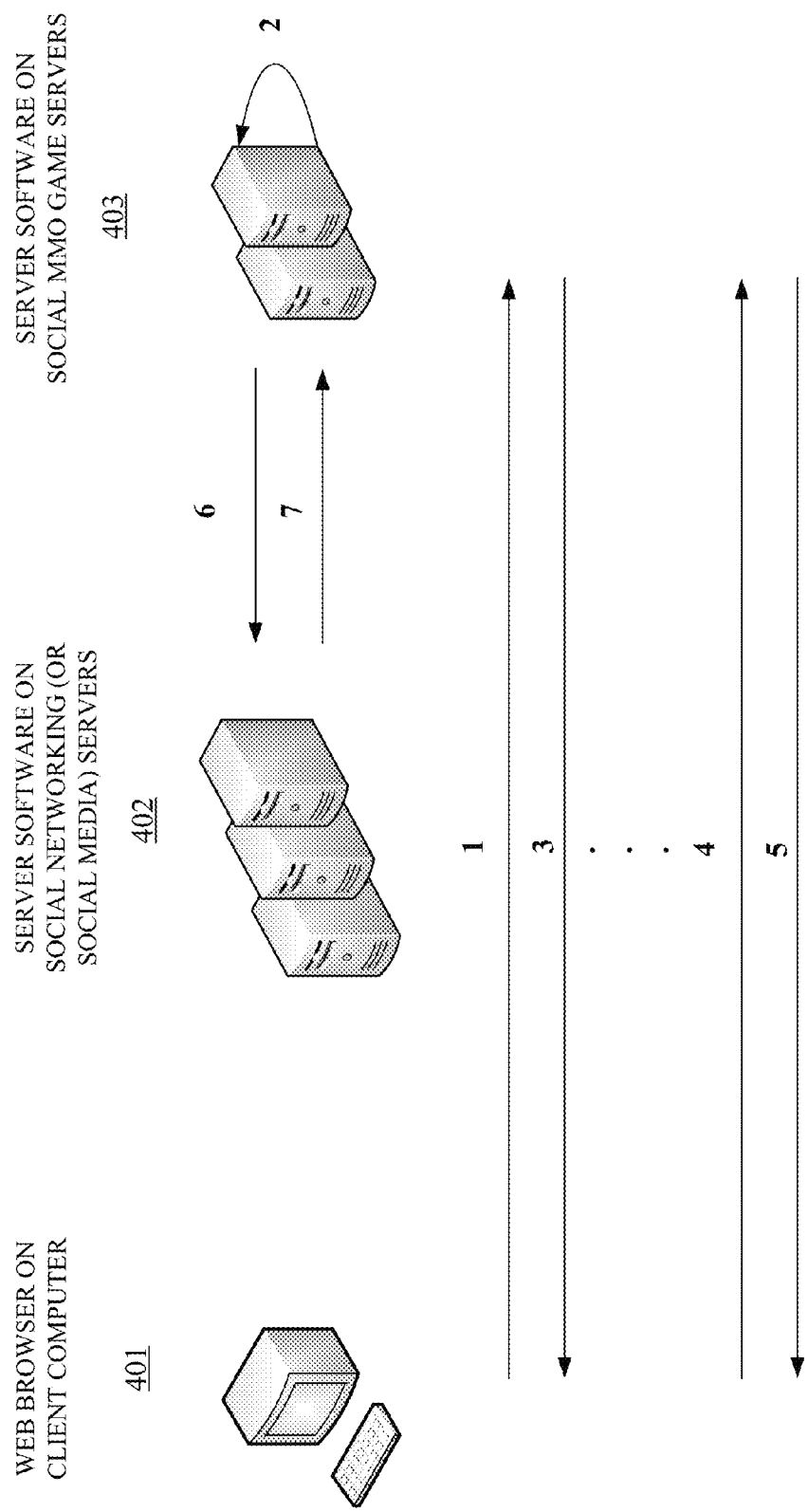
FIG. 4B is a simplified diagram that illustrates a sequence of transmissions associated with a social MMO game accessed from a MMO website, in accordance with an example embodiment.

FIG. 4B is a simplified diagram that illustrates a sequence of transmissions associated with a social MMO game accessed from a MMO website, in accordance with an example embodiment. In operation 1, the player clicks on a graphic for a social MMO game, causing browser 401 to transmit an HTTP request to server software 403 (e.g., Zynga) for the game's initial web page. The game's initial web page might be an application server page (e.g., PHP 5) or an HTML5 page. In operation 2, the application server page executes on server software 403 (e.g., Zynga), resulting in requests to databases and other servers as needed to complete generation of the web page, including possibly an HTTP request (not shown) transmitted to an API exposed by server software 402 (e.g., Facebook). In operation 3, the server software 403 (e.g. Zynga) returns the game's initial web page (e.g., HTML5 and JS) for the browser to display.

At some point thereafter, in operation 4, the player clicks on a graphic (e.g., representing a GUI widget) on a game web page (e.g., HTML5 and JS), causing browser 401 to transmit an HTTP request to server software 403 (e.g., Zynga), requesting assistance on a game task. In operation 5, the server software 403 (e.g. Zynga) returns a web page (e.g., HTML5 and JS) to the browser indicating that the request was received. In operation 6, the server software 403 (e.g., Zynga) transmits an HTTP request to an API exposed by server software 402 (e.g., Facebook), posting a request for assistance to the profiles (e.g., through a Facebook notification) and/or streams of the requesting player's friends on the social network managed by server software 402 (e.g., Facebook). Here again, it will be appreciated that in order to access the friends' profiles and/or streams (e.g., using an access token), the server software 403 (e.g., Zynga) might have earlier obtained permission from the friends, e.g., when they joined the game. Then in operation 7, server software 402 (e.g., Facebook) sends a response, e.g., in JSON, to server software 403 (e.g., Zynga) describing the success or failure of the posting to each profile and/or stream. In a subsequent session, server software 403 (e.g., Zynga) might use operations similar to operations 6 and 7 to send an automated apparent response to the player, as described earlier.

Here again, in an alternative example embodiment, the game's initial web page (or some subsequent web page served by the game) might have an Adobe Flash application (e.g., a Small Web Format or SWF file) embedded in it. In this alternative example embodiment, the user of browser 401 might thereafter interact with the Adobe Flash application (e.g., its GUI), which, in turn, might interact with the server software 402 (e.g., Facebook) and the server software 403 (e.g., Zynga).

It will be appreciated that the description above uses Facebook as an example of a social networking website, in numerous instances. This use is intended to be illustrative, rather than limiting. Other social networking websites, such as Google+, might have been used instead of Facebook. Or the description might have used a social media website, such as MySpace. As previously noted, the term "social networking website" as used in this disclosure is to be broadly interpreted to include, for example, any website that allows its users to selectively access (e.g., according to a contact list, buddy list, social graph, etc.) each other's profiles and/or streams or selectively communicate (e.g., according to a contact list, buddy list, social graph, etc.) with each other.

Some portions of the disclosure describe algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like.

Furthermore, it is also convenient at times, to refer to certain arrangements of steps requiring physical manipulations of physical quantities as modules or code devices, without loss of generality. It should be borne in mind, however, that all of these and similar terms are to be associated with the appropriate physical quantities and are merely convenient labels applied to these quantities. Unless specifically stated otherwise as apparent from the context, descriptions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission, or display devices.

Certain aspects of the example embodiments include process steps and instructions described herein in the form of an algorithm. It should be noted that the process steps and instructions of the example embodiments could be embodied in software, firmware, or hardware, and when embodied in software, could be downloaded to reside on and be operated from different platforms used by a variety of operating systems. Some example embodiments also relate to an apparatus for performing the operations described in the disclosure. This apparatus might be specially constructed for the required purposes, or it may comprise a general-purpose computer selectively activated or reconfigured by a computer program stored in the computer. Such a computer program might be stored in a computer-readable storage medium, such as, but is not limited to, any type of disk including floppy disks, optical disks, CO-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions.

Furthermore, one or more of computers referred to in the disclosure might include a single processor or might be architectures employing multiple processor designs for increased computing capability. The algorithms and/or displays described in the disclosure are not inherently related to any particular computer or other apparatus. Various general-purpose systems may also be used with programs in accordance with the teachings described in the disclosure, or it might prove convenient to construct more specialized apparatuses to perform the described method steps.

In addition, the example embodiments in the disclosure are not described with reference to any particular programming language. It will be appreciated that a variety of programming languages might be used to implement the example embodiments.

Accordingly, the disclosure of the example embodiments is intended to be illustrative, but not limiting, of the scope of the inventions, which are set forth in the following claims and their equivalents. Although example embodiments of the inventions have been described in some detail for purposes of clarity of understanding, it will be apparent that certain changes and modifications can be practiced within the scope of the following claims. In the following claims, elements and/or steps do not imply any particular order of operation, unless explicitly stated in the claims or implicitly required by the disclosure.

What is claimed is:

1. A method, comprising operations of:
    receiving a request for assistance with a game task from a first player of a massively multiplayer online (MMO) game;
    broadcasting the request to a second player of the MMO game using an application programming interface (API) exposed by software running on a social networking website or a social media website;
    determining whether the second player responds to the request within a time period, wherein the time period depends on one or more factors including data received from a profile or stream associated with the first player on the social networking website or the social media website;
    assigning completion of the game task to the first player, if the second player does not respond within the time period; and
    transmitting an automated apparent response to the first player, if the second player does not respond within the time period, wherein each operation of the method is executed by one or more processors.

2. The method of claim 1, wherein the second player of the MMO game is associated with the first player through a relationship recognized by the MMO game.

3. The method of claim 1, wherein the second player of the MMO game is associated with the first player through a social graph or social network.

4. The method of claim 1, wherein the automated apparent response indicates that the second player provided the requested assistance.

5. The method of claim 1, wherein the automated apparent response indicates that the first player was assigned completion of the game task because the first player assisted other players with their game tasks.

6. The method of claim 1, wherein the time period is pre-determined.

7. The method of claim 1, wherein the time period is dynamically determined at run-time.

8. The method of claim 1, wherein the data received from the profile or stream associated with the first player includes a status report from the first player.

9. The method of claim 8, wherein the status report expresses frustration with a lack of response to the request.

10. One or more computer-readable media that are non-transitory and that store a program, wherein the program, when executed, instructs one or more processors to perform the following operations:
    receive a request for assistance with a game task from a first player of a massively multiplayer online (MMO) game;
    broadcast the request to a second player of the MMO game using an application programming interface (API) exposed by software running on a social networking website or a social media website;
    determine whether the second player responds to the request within a time period, wherein the time period depends on one or more factors including data received from a profile or stream associated with the first player on the social networking website or the social media website;
    assign completion of the game task to the first player, if the second player does not respond within the time period; and
    transmit an automated apparent response to the first player, if the second player does not respond within the time period.

11. The computer-readable media of claim 10, wherein the second player of the MMO game is associated with the first player through a relationship recognized by the MMO game.

12. The computer-readable media of claim 10, wherein the second player of the MMO game is associated with the first player through a social graph or social network.

13. The computer-readable media of claim 10, wherein the automated apparent response indicates that the second player provided the requested assistance.

14. The computer-readable media of claim 10, wherein the automated apparent response indicates that the first player was assigned completion of the game task because the first player assisted other players with their game tasks.

15. The computer-readable media of claim 10, wherein the time period is pre-determined.

16. The computer-readable media of claim 10, wherein the time period is dynamically determined at run-time.

17. The computer-readable media of claim 10, wherein the data received from the profile or stream associated with the first player includes a status report from the first player.

18. The computer-readable media of claim 17, wherein the status report expresses frustration with a lack of response to the request.

19. A method, comprising the operations of:
receiving a request for assistance with a game task from a first player of a social MMO game;
using an application programming interface (API) exposed by software running on a social networking website or a social media website to broadcast the request to a second player of the social MMO game who is associated with the first player through a relationship that allows the second player to access a profile or stream associated with the first player on the social networking website or the social media website and allows the first player to access a profile or stream associated with second player on the social networking website or the social media website;
monitoring whether the second player responds to the request within a time period, wherein the time period is dynamically determined at run-time and wherein the time period depends on one or more factors including data received from the stream associated with the first player;
assigning completion of the game task to the first player, if the second player does not respond within the time period and the game task is a game task whose completion can be assigned without the assistance of another player; and
transmitting an automated apparent response to the first player, if the second player does not respond within the time period and the game task whose completion can be assigned without the assistance of another player, wherein each operation of the method is executed by one or more processors.

20. The method of claim 19, wherein the data received from the stream associated with the first player includes a status report from the first player.

* * * * *